June 8, 1965
E. UMBRICHT
3,187,883
ARTICLE TRANSFER MECHANISM
Original Filed March 4, 1963
7 Sheets-Sheet 1
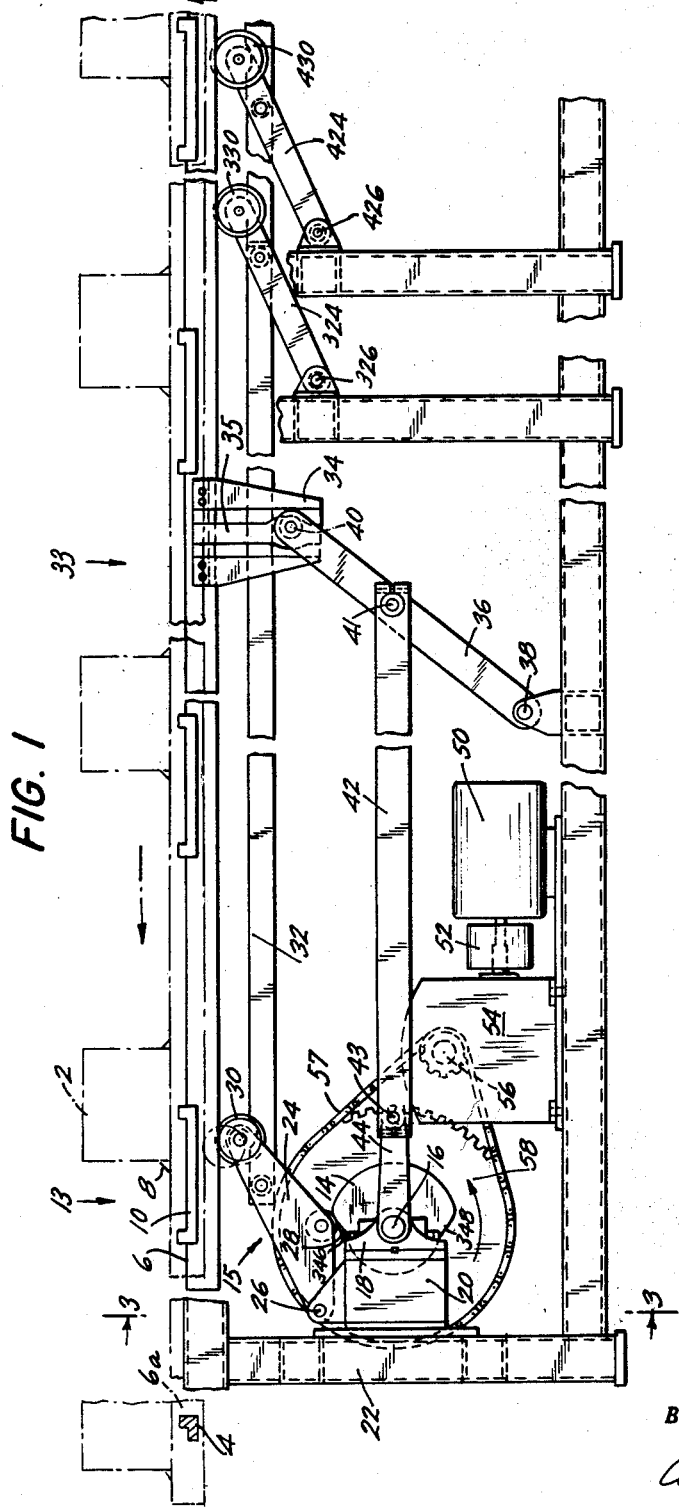
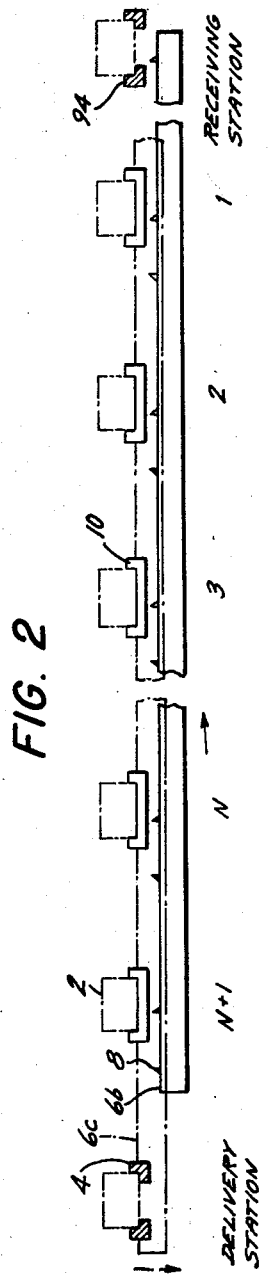
INVENTOR.
EMIL UMBRICHT
BY
Curtis, Morris & Safford
ATTORNEYS June 8, 1965 E. UMBRICHT 3,187,883
ARTICLE TRANSFER MECHANISM
Original Filed March 4, 1963 7 Sheets-Sheet 2

INVENTOR.
EMIL UMBRICHT
BY
Curtis, Morris & Safford
ATTORNEYS

June 8, 1965  E. UMBRICHT  3,187,883
ARTICLE TRANSFER MECHANISM
Original Filed March 4, 1963  7 Sheets-Sheet 4

INVENTOR.
EMIL UMBRICHT
BY
Curtis, Morris & Safford
ATTORNEYS

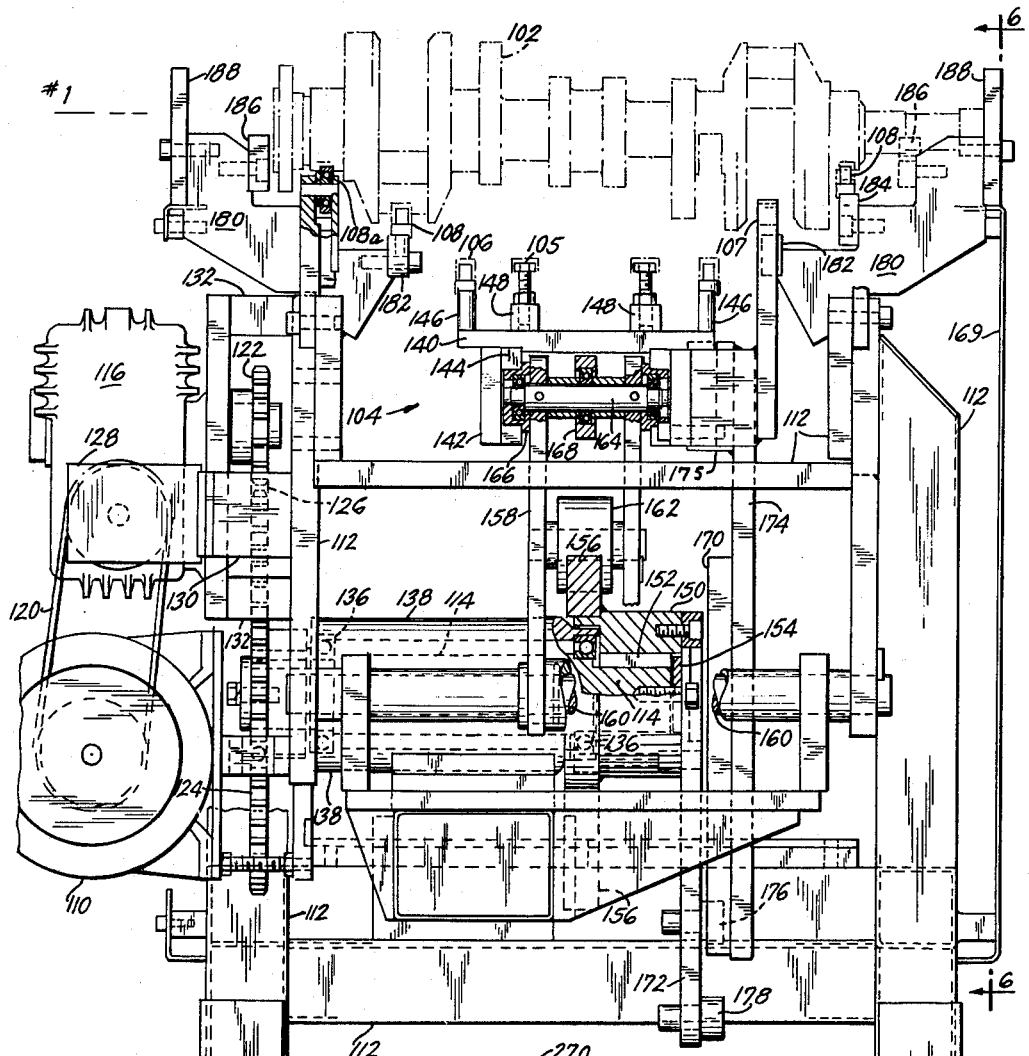

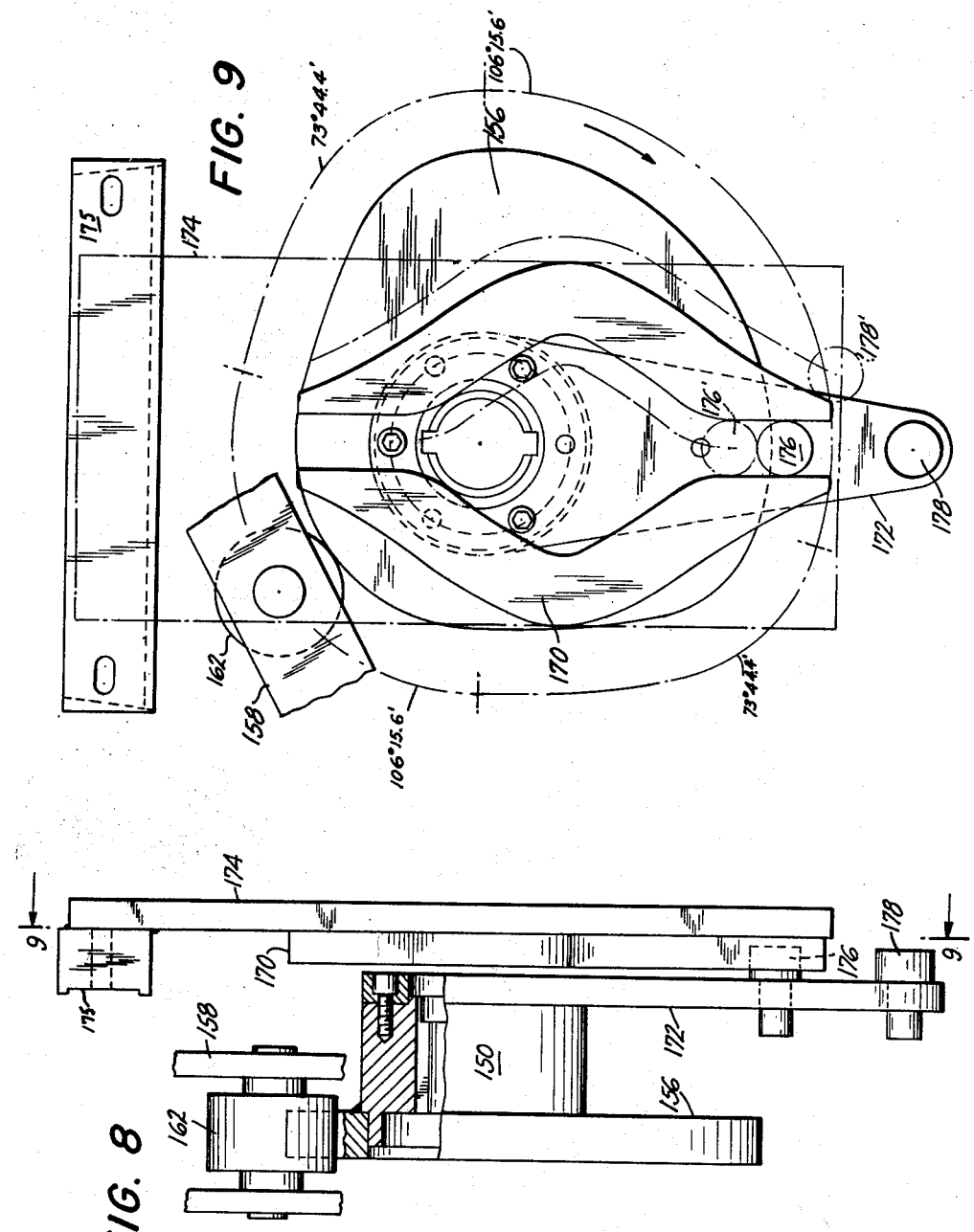

United States Patent Office 3,187,883
Patented June 8, 1965

3,187,883
ARTICLE TRANSFER MECHANISM
Emil Umbricht, Northville, Mich., assignor to
Ajem Laboratories, Inc., Livonia, Mich.
Continuation of application Ser. No. 263,383, Mar. 4,
1963. This application May 26, 1964, Ser. No. 371,175
9 Claims. (Cl. 198—219)

The present invention relates to apparatus for intermittintently transferring a series of manufactured articles in succession from station to station along a processing line and wherein the movement of the articles and their positioning into each station is positively controlled.

This application is a continuation of my prior copending application, Serial No. 263,383, filed March 4, 1963, which in turn was a continuation-in-part of an earlier copending application, Serial No. 50,138, filed August 17, 1960, now abandoned.

In the mass-production industries there are many manufacturing steps or assembly procedures which are not adaptable to a continuous conveyor operation but require the articles instead to be located precisely and held in position for a definite period of time while each is processed and then all are simultaneously moved on. The need for an efficient article transfer apparatus with the ability smoothly and accurately to position each and every article is important so as to avoid scarring machined surfaces or violating close tolerances and to attain a minimum of jarring and vibration.

Prior to the present invention the devices which were employed were unable to combine all of the desired operating characteristics with simplicity of design and low cost of construction and maintenance. In most prior devices numerous control switches were required to produce the desired components of motion, resulting in complex and expensive machines, which were difficult to set up and maintain. For example, the prior art in this field often used arcs or inclined groove systems which have the disadvantage of having some horizontal motion always present, or alternatively, combined independently driven horizontal and vertical motions, with the result that as the transfer motion improved, the apparatus became more and more complex and expensive.

The machine described herein as an embodiment of the present invention accomplishes article transfer along a predetermined path by resolving the vertical and horizontal components of the motion and by controlling and activating each component by a separate cam system, which can advantageously be driven by a single power source. The positions of all the articles at each stage of the transfer movement are thus positively controlled. Furthermore, while the cam of the vertical component of is rotated actively to generate the vertical component of motion, the cam of the horizontal cam system passively receives and modifies the horizontal component of motion already rotatively generated. An advantage in employing a different type of cam system for each component of motion rests in the fact that a rotatable cam wheel, used in the vertical component, has a simplified structure but the amplitude of motion which can be derived therefrom is limited, while the passive horizontal-cam can be used to control motion of a greater magnitude that has been rotatively generated by a system that is slightly more complex than that of the vertical system but decidedly simpler and more versatile than that of the prior art.

Many other definite advantages are provided by a machine embodying the present invention as disclosed herein. Each cam means and cam follower means can be arranged to give desired variation in speed and distance, thereby providing a smooth, precise, and predetermined path of transfer for the articles. Such versatility can be especially appreciated when handling heavy articles such as automobile engine blocks where smooth acceleration prevents jarring or sliding where precision ensures that the article will be accurately positioned (often on fragile locating pins, or the like, where no horizontal motion can be present) so that the process, such as honing, drilling, or grit blasting, to be performed at that processing station can be done to within close tolerances.

Further advantages are found in the machine's wide adaptability. The activating cam systems can be placed where desired along the transfer member to conform to space requirements. The cam systems can be repeated as necessary to accomplish larger load requirements. The machine can operate over a wide range of speeds to accommodate for increased production rates while still providing accuracy of placement and control of the positions of all of the articles in spite of the high rate of production.

Another advantage is the compactness and simplicity of the operating mechanism and control apparatus, so that it is readily adapted to be operated in confined spaces and where more complex machinery would be damaged by operating conditions.

Still a further advantage is the magnitude of horizontal travel and rugged construction that can be achieved without sacrificing compactness and simplicity.

Another advantage of this device is the ability to provide transfer motion having separte periods of vertical and horizontal movement.

The various aspects, features, and advantages of the present invention will be more fully understood from the following description considered in conjunction with the accompanying drawings showing a present preferred embodiment illustrative of the invention in which:

FIGURE 1 is a side elevational view from the right side of FIGURE 3 of a machine embodying the present invention, portions of the near side of the machine frame being shown cut away to indicate more clearly the various working parts. The movable transfer frame is also illustrated in a different position in dash and dot outline so as to show its operation;

FIGURE 2 is a schematic side elevational view of the movable transfer frame showing, on diminished scale, the transfer frame in its return position and also showing, in dash and dot outline, this transfer frame in its position for delivery of articles;

FIGURE 7 is an end elevation taken on line 7—7 of FIGURE 6 with a center portion being shown cut away to indicate more clearly various working parts. Again, a crankshaft is schematically shown in dash-dot outline seated in an article-holding station;

FIGURE 8 is an enlarged end elevation of the two cam systems similar to the view in FIGURE 7;

FIGURE 9 is a side elevation of the two cam systems taken along line 9—9 in FIGURE 8 with the two cam-bar rollers shown in dash-dot outline as they would be relative to the cam bars if the crank arm were rotated 325° clockwise;

FIGURE 11 is a side elevation similar to that in FIGURE 9 and in FIGURE 6 of a second improved embodiment of the present invention;

Figure 3:
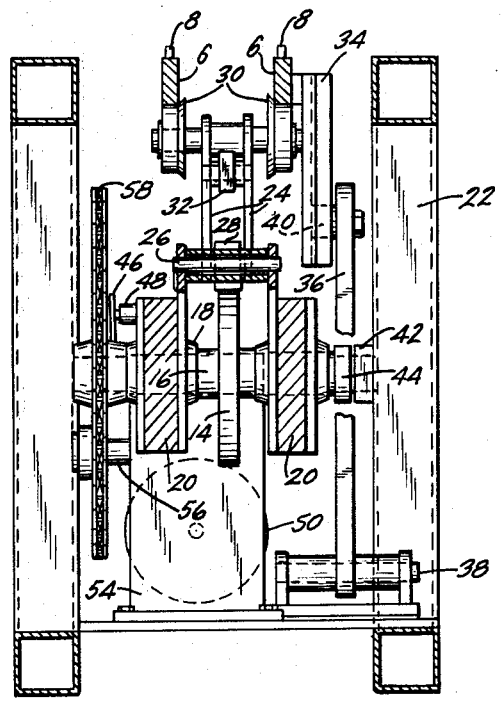
FIGURE 3 is a cross-sectional view, taken generally along line 3—3 in FIGURE 1 looking to the right, but with parts of the central mechanism shown in elevation.

The first preferred embodiment and variations thereon illustrated in FIGURES 1–5 and by reference Nos. 1–99 and 300–499 will be described in full before the discussion of the improved preferred embodiments and improvements thereon illustrated by FIGURES 6–12 and by reference Nos. 101–299 is made.

The machine shown in FIGURE 1 is well suited for use in handling, during processing, manufactured articles such as are fabricated in the mass-production industries. This machine, as shown, is particularly well suited for handling complex articles at a high production rate, for example, automobile engine blocks and cylinder heads, and a wide variety of castings, forgings, stampings, and machined parts.

In this machine the manufactured article 2 to be transferred are picked up in sequence from a production line 94 at a receiving station (see the right of the machine in FIGURE 2). The articles are longitudinally advanced step-by-step through the machine by means of a transfer frame 6, each article being securely held during such movement by the article holding means 8. Between successive advancing movements, all of the articles are accurately placed in a succession of uniformly spaced article-processing stations 10 wherein fabrication, power washing, or other manufacturing processes are performed. During the period while all of the articles are dwelling in the respective processing stations, the transfer frame returns to its initial or pick-up position by passing below the stationed articles, so that the transfer frame becomes ready to repeat the transfer cycle. In this cyclically repeated and accurately controlled sequence, a plurality of articles are simultaneously transferred from station to station along a longitudinal path through the machine. During each transfer cycle the transfer frame picks up an incoming article at the right and delivers another to the machine at the left.

The vertical component of this transfer motion is imparted to the transfer frame by first cam-and-follower means, generally indicated at 13 and comprising a cam wheel 14 and follower means 15. The cam wheel 14 is driven by a rotatable shaft 16 which is journalled in a pair of bearings 18. These bearings are mounted on the main frame 22 of the machine by extension members 20. The smallest radius $R_1$ of the cam wheel determines the lowest position of the transfer member, conversely the longest radius $R_2$ determines the highest position, and the slopes of the inclined cam surfaces between $R_1$ and $R_2$ determine the respective rates of elevation and lowering of the transfer frame. The cam follower lever 24 is pivoted on the machine frame extension 20 at a pivot 26 and is operated by a cam follower roller 28 mounted on this lever at a point directly over the axis of the drive shaft 16 and in the same horizontal plane with pivot 26 when the machine is in pick-up or delivery position. The pick-up position is depicted at 6 in FIGURE 1 and the delivery position at 6C in FIGURE 2.

Figure 5:
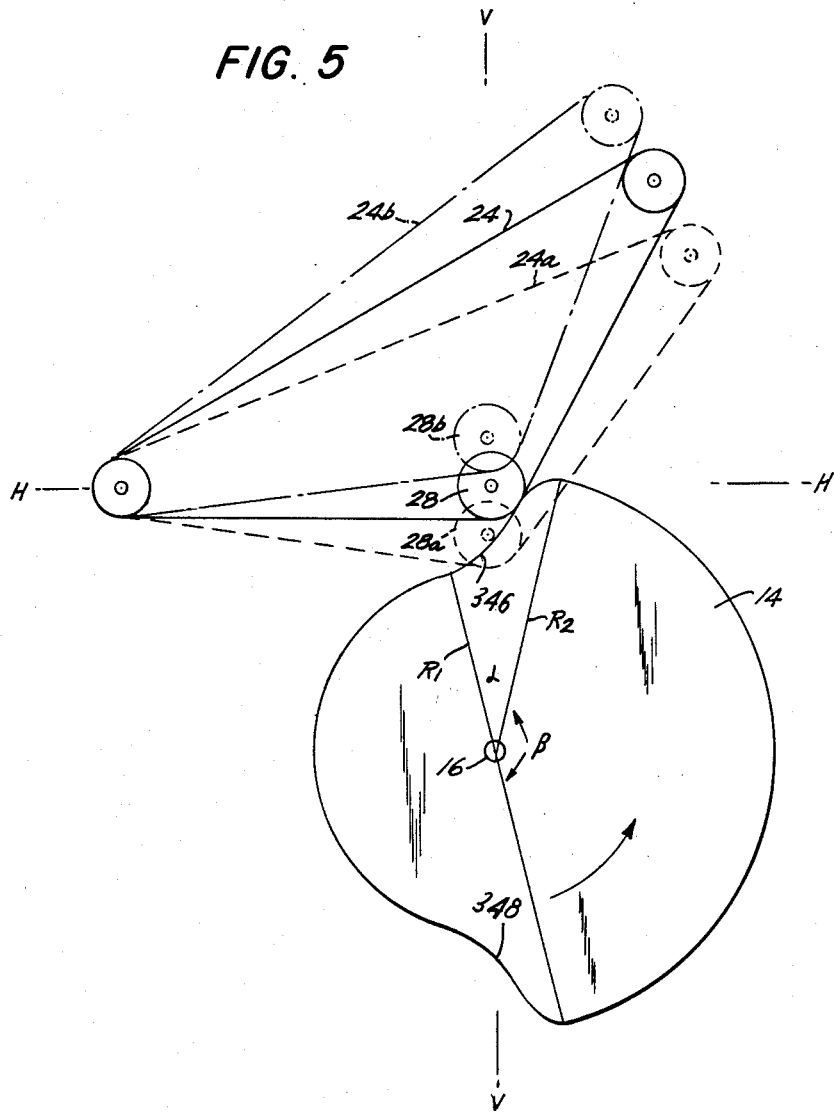
FIGURE 5 is a diagrammatic side elevational view of the cam wheel and its follower means showing the motion of said follower means relative to the rotation of the cam wheel by the broken line positions.

This positioning of the pivot 26 and roller 28 with respect to the axis of the drive shaft enables use of a symmetrical cam wheel so as to provide a symmetrical transfer motion. As can be seen in FIGURE 5, roller 28 moves away from the vertical symmetry line V—V, so a symmetrical cam provides symmetrical motion only for comparatively small angles of movement of the lever 24 away from the horizontal.

In order to elevate and lower the transfer frame 6, there is a flanged support roller 30 (broadly known as an anti-friction bearing means) mounted on the cam follower lever 24 at its opposing end from the pivot 26. Thus, an advantageous multiplier effect is provided so as to increase the radial distance moved on the cam to the vertical distance moved by the transfer frame 6. Use of the support roller 30 allows the transfer of only vertical motion from the first cam-and-follower means 13 to the transfer frame and facilitates the horizontal motion that is imparted to the transfer frame by the second cam-and-follower means, to be described further below. The flanges on the rollers 30 guide the transfer frame 6 during its longitudinal movement.

As shown in FIGURE 1, the cam follower lever 24 is actually one of a plurality of similar levers that support, raise, and lower the transfer frame 6. Lever 324 and lever 424 are the same as lever 24 and are kept in parallel relation to lever 24 by a connecting rod 32, the only major difference being that the lever 24 alone has a cam follower roller. It is noted that the connecting rod 32 is in tension during the actual transfer of the article and is in compression only when being returned to the pick-up position when not bearing a load; this allows use of a lighter connecting rod. It is an advantage of this invention that the series of levers can be increased in number for an elongated transfer frame or that the vertical or horizontal cam systems can be repeated for heavier loads, all within the scope of this invention.

The horizontal component of the transfer motion is initially established by the crank 44, and the amplitude of the motion is determined by the length of crank 44. In many cases the feasible length of the crank may not be sufficient to provide the required horizontal travel without exceeding the limits of space available for its swing. Therefore, a motion-multiplier, in this case a compound lever 36, is used to amplify the horizontal motion which is imparted to the transfer frame by the second cam-and-follower means, generally indicated at 33. The second cam in the first preferred embodiment comprises slotted guide means 34 (alternatively referred to as a combined vertical-lost-motion coupling means and a horizontal-motion-cam means), which is fixed to the transfer frame 6. The generally vertical slot 35 defines the second cam surface, and the phasing of the horizontal movement of the transfer frame 6 with respect to its vertical movement and its acceleration and deceleration is controlled by the configuration of this cam slot 35. The configuration in this first preferred embodiment as disclosed in FIGURE 1 provides horizontal motion to the transfer member only after the vertical motion derived from the first cam-and-follower means has ceased.

Lever 36 is pivoted on the machine frame 22 at a pivot 38 and has a cam bearing means, shown as a roller 40 mounted at the free end of the push-pull lever 36 which roller 40 is engaged in this guide cam slot. It will be appreciated that in the second cam-and-follower system the roller 40 imparts the motion to the cam instead of vice versa as in the case of the first cam-and-follower system. This second cam follower means includes a crank arm 44 mounted on the drive shaft 16, the lever 36 with roller 40, and a connecting rod 42 extending between them and pivotally connected to them at pivots 41 and 43.

The prime mover in this drive mechanism is shown as an electric motor 50. An overload release coupling 52, a gear reduction train 54, and a drive sprocket 56 are connected in series through a chain 57 to a large driven sprocket 58, which latter is secured to the shaft 16, which in turn drives the cam 14 and the crank arm 44. The overload release coupling is adapted to release the drive to avoid damage in case of jamming, as will be understood.

In order to stop the transfer apparatus between each completed cycle, a limit switch 48 (FIGURE 3) may be mounted on the machine, e.g., on the frame extension 20 and is tripped by a limit switch cam 46 after each complete revolution of the drive shaft 16. The limit switch is used for timing purposes, and in the example shown it is electrically coupled with a timing mechanism associated with the remainder of the production line, for example, a sensing switch (not shown) at the delivery station (left end on FIGURES 1 and 2) thereby initiating the next cycle as oon as the delivered article has been removed from the output station.

Figure 4:
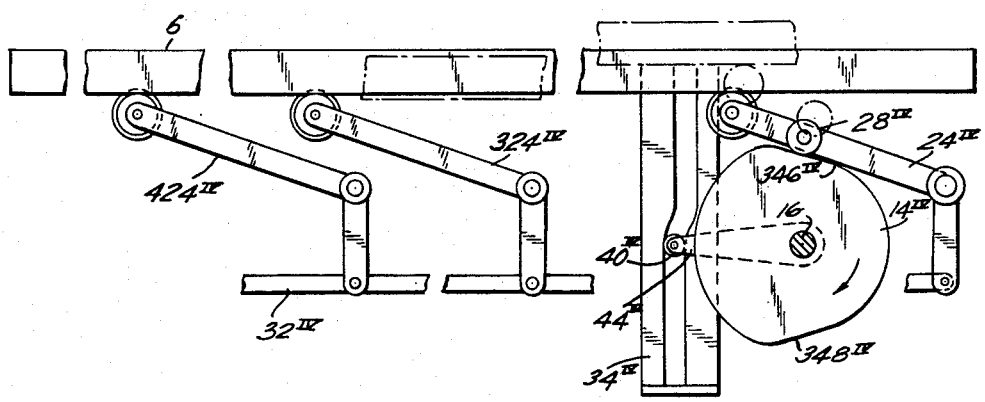
FIGURE 4 is a side elevational view of another embodiment of the present invention, only the operative elements of the two cam systems being shown.

FIGURE 4 shows another embodiment of the present invention similar to the one described above except that the second cam follower means comprises a crank arm $44^{IV}$ having a cam follower roller $40^{IV}$ at its extremity. The corresponding parts are indicated by like reference characters, adding a Roman number where I wish to distinguish the particular part on one figure.

The full sequence of operation of the various parts according to my invention can best be visualized by dividing a single article transfer motion into four steps; pick-up, forward, set-down, and return. One complete rotation of the drive shaft 16 (clockwise on FIGURE 4 and counterclockwise on FIGURES 1 and 5) results in the advancement of all the articles along the longitudinal path of the machine from one station to the next succeeding one. The pick-up motion is defined by the travel of cam follower roller 28 along the inclined transition surface 346 of the cam wheel 14 between the surface of Radius $R_1$ and the surface of radius $R_2$ (the surface subtended by angle $\alpha$ in FIGURE 5). The lifting of roller 28 causes the simultaneous lifting of all of the parallel-connected series of levers 24, 324, and 424, which in turn lift the transfer frame 6. This elevation of the transfer frame lifts all of the articles from their respective stations.

The machine is shown in FIGURE 1 about half-way through its pick-up motion just on the point of lifting the articles 2 (not shown) in this position from their stations 10. Crank arm 44 has also moved through an angle $\alpha$. Since the pivot 43 has very little horizontal motion in this part of its rotation, the cam follower drive roller 40 has very little horizontal motion imparted to it. Consequently the configuration of the lower part of the cam slot 35 (alternatively referred to as a bulge, i.e. flared portion) readily accommodates any such horizontal motion, with the result that this second cam-and-follower means allows the transfer frame 6 to move only vertically during the elevation step.

The horizontal forward motion of the transfer frame is effected by that horizontal component of the motion of the cam follower roller 40 in the narrow part of the cam slot 35 (alternatively referred to as a combined vertical-lost-motion slot and horizontal-motion cam, a portion of which together with the roller 40 can more broadly by referred to as the vertical-lost-motion coupling means), that horizontal motion being imparted by the cam 34 to the transfer frame 6, which is rigidly connected to the cam 34. This forward motion is accomplished when the crank arm 44 has moved through an angle $\beta$ (FIGURE 5), and when the cam follower 28 has rolled along the $R_2$ surface (subtended by angle $\beta$ in FIGURE 5). This forward position is shown in dash and dot outline of the transfer frame 6a in FIGURE 1.

The set-down motion is the same as the pick-up motion except that now the roller 28 is moving from the surface of radius $R_2$ down along the inclined transition surface 348 to the surface of radius $R_1$. Similarly the return motion is the same as the forward motion except the direction has been reversed, because the horizontal motion of the crank arm 44 is now from left to right. FIGURE 2 shows the set-down position in dash and dot outline with the last article being delivered to another production line (shown as the shaded track 4), and a new article has moved up to the receiving station ready to be picked off from the preceding production line (shown as the shaded track 94).

At the end of the return stroke the limit-switch-cam again trips the limit switch and thus completes the cycle.

Hereinafter the description will be confined to the improved preferred embodiment of my invention and variations thereon as illustrated in FIGURES 6–12.

In the improved preferred embodiment shown in FIGURES 6–10, the manufactured articles 102 to be transferred are delivered in sequence from a production line (not shown) to receive station #1. The articles 102 (here depicted as crankshafts) are sequentially advanced simultaneously from one article holding station #2, to the next #3, and so on by means of a transfer frame 104, being securely held on the frame during such transfer by article holding means 105 and 106 which are uniformly spaced along the transfer frame 104 corresponding with the spacing of the article holding stations. Between successive advancing movements, all the articles 102 are accurately placed in cradling means 108 at each station wherein fabrication, power washing, or other manufacturing or treating processes are performed. During the period while all the articles 102 are dwelling in their respective stations, the transfer frame 104 returns to its initial or pick-up position by passing below the stationed articles, so that the transfer frame 104 becomes ready to repeat the transfer cycle. This transfer cycle is generated by a single drive mechanism whose motion is resolved into two separate cam-and-follower systems, which components when they are modified and independently imparted to the transfer frame 104 combine into the resultant predetermined transfer motion. This motion is rectangular in the illustrated improved preferred embodiment.

The drive mechanism, best illustrated in FIGURE 7, is advantageously a heavy-duty electric motor 110 hung from the machine frame 112 and which rotates drive shaft 114 through gear reducer 116 to give proper low r.p.m. with high torque whose input shaft 118 is connected to the motor 110 by belt system 120 and whose output sprocket 122 is connected with the drive shaft sprocket 124 by sprocket chain 126. Mounted on the other end of the gear reducer input shaft 118 is speed-drop-cut-out switch 128 which shuts the machine down if proper speed is not maintained due to motor overload or jamming or other such reasons. This switch 128 is mounted on machine frame 112 by L-bracket 130. Gear reducer 116 is mounted on machine frame 112 by spacers 132. A tension idler 134 is pivotally hung off machine frame 112 and is properly sprung to ride between sprockets 122 and 124 and bear on chain 126. Drive shaft 114 is journalled in a pair of bearings 136 which in turn are encased in cylindrical bearing housing 138 which is fixed to the machine frame 112 (see FIGURE 7). Drive shaft 114 has mounted on its end, opposite from its sprocket 124, a crank-and-cam-wheel hub 150 which is fixed there by key 152 and retainer plate 154.

The vertical component of the transfer motion is imparted to transfer frame 104 by the first cam-and-follower means which is generally composed of cam wheel 156 and lift arm 158. As can be best seen in FIGURE 9, cam wheel 156 has a first segment subtending a given angle (here drawn as 106° 15.6') at a constant radius determining the lower vertical dwell period of the transfer cycle, a third segment (also 106° 15.6') diametrically opposite the first and having a constant radius greater than that of the first determining the upper vertical dwell period, a second and a fourth segment (each drawn here as subtending 73° 44.4') having radii increasing and decreasing respectively, advantageously with smooth acceleration-deceleration curves, to connect those of the first with those of the third. The cam wheel 156 is mounted on drive shaft hub 150.

Figure 6:
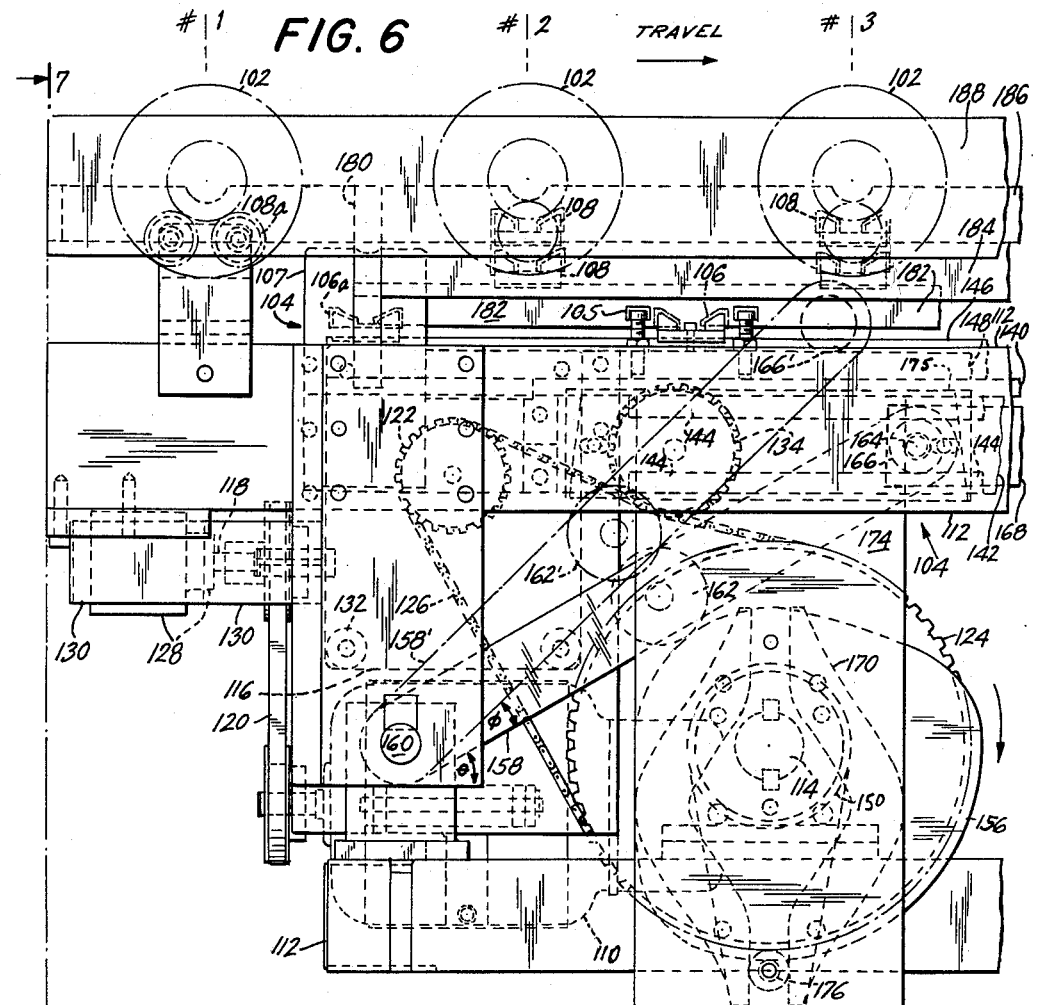
FIGURE 6 is a side elevation taken on line 6—6 of FIGURE 7, showing an improved preferred embodiment of the present invention from the right-hand side of FIGURE 7. Crankshafts are schematically shown in dash-dot outline seated in respective article holding stations and a lift arm is shown in two positions, the raised position being in dash-dot outline.

Lift arm 158 is pivotally mounted on machine frame 112 by pivot shaft 160 and coupled to the cam surface of cam wheel 156 by cam follower roller 162. The free end of lift arm 158 carries an axle 164 for flanged support rollers 166 which latter make a horizontal-lost-motion, anti-friction coupling to support the transfer frame 104. In other words, use of the support roller 166 allows the transfer of only vertical motion from the first cam-and-follower means to the transfer frame 104 and facilitates the horizontal motion that is imparted to the transfer frame 104 by the second cam-and-follower means, to be described further below. Tie bar 168 is pivotally fixed to lift arm 158 by axle 164 to connect the lift arm 158 with at least one other lift arm (not shown in the improved preferred embodiment, since it occurs in the broken away portion of the first preferred embodiment indicated to the right in FIGURE 1). This other lift arm is pivoted off a shaft similar to pivot shaft 160 at the same height only displaced longitudinally along the machine frame 112 and is itself identical with lift arm 158 except for this displacement and the absence of a cam follower roller 162. At least one additional coacting lift arm is necessary to complete the support of the transfer frame 104. The extension of tie bar 168 and the other lift arms, pivot shafts, and such are illustrated in FIGURE 1 of the copending application by myself and my co-workers John L. Rudlaff, Serial No. 277,272, filed May 1, 1963 (Attorney's Docket No. 123578). FIGURE 6 of the improved preferred embodiment and FIGURE 1 of our copending application, when taken together, illustrate a complete functional unit of a versatile conveying machine embodying several novel inventions; see also my copending application, Serial No. 268,870, filed March 29, 1963 (123524).

Proper positioning of pivot shaft 160 and cam follower roller 162 with respect to the axis of cam wheel 156 enables use of a symmetrical cam wheel to provide symmetrical lifting and lowering in the transfer motion. Reference to FIGURE 6 helps to illustrate this point, where lift arm 158 is shown in the lower position half-way through the dwell period but is also shown in phantom outline (with corresponding reference numbers having a prime (') accent to differentiate them) as it would appear in the raised position. A line drawn from the axis of cam wheel 156 through that of cam follower roller 162 intersects the axis of the raised cam follower roller 162'. This is the symmetry line (see line g in FIGURE 12 and discussion thereof below) which is not substantially deviated from when the lift arm is relatively long between roller 162 and shaft 160 and when angle of rotation φ of the lift arm (defined by the axis of roller 162, of pivot shaft 160, and of roller 162') is kept small. Of course non-symmetrical motion in some cases may not be undesirable, or may alternatively be compensated for in the shape of the cam wheel itself.

By positioning support rollers 166 on lift arm 158 beyond cam follower roller 162, an advantageous multiplier effect is achieved. If the magnitude of vertical motion were critical, then the radial increase of the cam wheel 156 could be better taken advantage of by positioning the cam follower roller 162 vertically over the axis of the cam wheel 156. This, however, would produce quite asymmetrical vertical motion unless the lift arm 158 were also made substantially horizontal.

Figure 10:
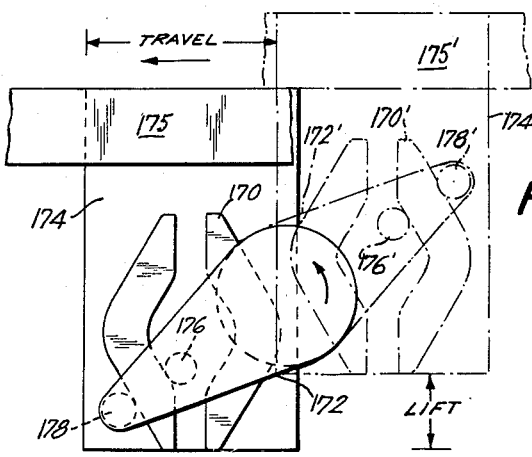
FIGURE 10 is a schematic side elevation of the horizontal cam system taken from the side opposite that shown in FIGURES 6, 9, and 11, illustrating relative motion with the second position being shown after a 180° counterclockwise rotation in dash-dot outline.

The horizontal component of the transfer motion is imparted to the transfer frame 104 by the second cam-and-follower means, normally hidden behind dust plate 169, which is generally composed of cam bars 170 and a crank arm 172. Crank arm 172 is mounted at the extreme end of drive shaft hub 150. Cam bars 170 are fixed to mounting plate 174 facing crank arm 172, which plate 174 in turn is fixed to and depended from transfer frame 104 by means of spacing bar 175. Crank arm 172 has two radially spaced cam follower rollers 176 and 178 rotatably mounted at its free end. Inner roller 176 transmits the rotational motion of the crank arm 172 to the cam bars 170. Cam bars 170 dissipate the vertical component of the rotational motion from roller 176 in a vertical-lost-motion slot, just wider than the roller itself, which slot is defined between the two cam bars 170. In addition, the cam bars are shaped to dissipate (or add to) the horizontal component of rotational motion received from roller 176 and thus impart a predetermined modified horizontal motion to said transfer frame 104. The internal cam surfaces of cam bars 170, as illustrated in FIGURES 6, 9, and 10, are shaped to transmit to the transfer frame 104 the horizontal component of the crank arm's rotational motion unmodified while the frame 104 is receiving no vertical motion, but in the middle of the cam bars 170 they deviate from a purely vertical slot and bulge out first to slow down and then to stop all horizontal motion from being imparted to the transfer frame 104, just as it begins to receive vertical motion from the first cam-and-follower system. To absorb the horizontal motion, the inner cam bar surface must follow but not be moved by the roller 176 as it continues to rotate along a circular path. To accomplish this absorption the bulge would define a circular arc but for the fact that said cam bars are simultaneously also moving, being carried vertically with the transfer frame 104, which results in the arc of the bulge being peaked as illustrated, rather than circular.

The external cam surfaces of cam bars 170 are shaped to engage the outer cam follower roller 178, at least while the inner cam follower roller 176 is traversing alternate sides of the bulge between cam bars 170, and further to maintain a width just sufficient to assure that outer roller 178 by rolling along the outer cam surfaces keeps the inner roller 176 always in positive contact with the inner cam surfaces. The dash-dot outline of rollers 176' and 178' and of the path of their axes along the right-hand cam bar 170, shown in FIGURE 9, serves to illustrate the function performed by outer roller 178.

Figure 12:
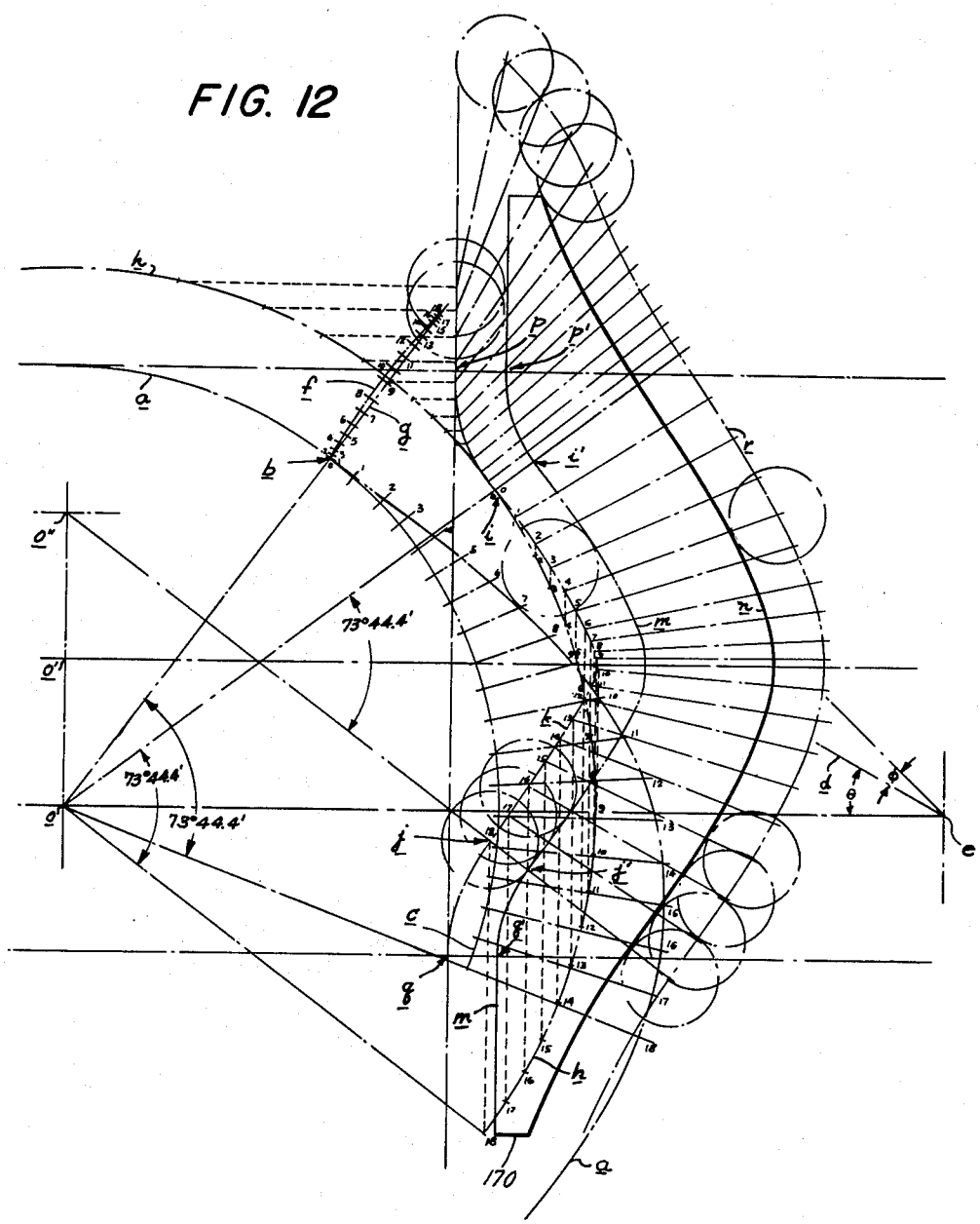
FIGURE 12 is a side elevation of a single cam bar similar to that shown in FIGURES 6, 9, 10, and 11, having superimposed thereon in schematic form two geometric plots illustrating how the shape of a cam bar for the improved preferred embodiment is derived with a given cam wheel.

A geometric method of deriving the shape of cam bar 170 for the improved preferred embodiment (or similarly, of cam plates 270) is illustrated in FIGURE 12. First the vertical motion of the cam plate 174 must be obtained, second it must be related to the circular motion of the cam follower rollers 176 and 178, then the cam bars can be shaped to accommodate this relative motion.

The outline $a$ traced by the axis of cam follower roller 162 relative to the surface of rotating cam 156 is plotted (using point $o$ as the center of rotation of cam 156 and of crank arm 172). Starting at point $b$ on curve $a$, which is the point where roller 162 starts to roll up the second segment (73° 44.4') of cam 156, angularly equispaced points are laid off and numbered on the second segment of curve $a$, in the present case 18 equispaced points at 4° 5.8' intervals. Next the radius of curve $a$ measured at point $b$ is used to generate curve $c$. The radial distance from $o$ between curve $a$ and curve $c$ is measured at each of the numbered 4° 5.8' intervals. In order to derive the motion of the axis of the cam follower roller 162 relative to the center *o* of cam 156, a line *d* is drawn from the curve *a* at point *b* extending down (to the right in FIGURE 12) to a point *e*. Point *e* corresponds to the axis of pivot shaft 160 and is in the same horizontal plane as is point *o*. Tangent *d* corresponds to that portion of the lift arm 158 from the axis of pivot shaft 160 to the axis of cam follower roller 162. Lift arm 158 in the lower position makes an angle $\theta$ with the horizontal and is rotated by cam 156 through an angle $\phi$ to the elevated position (see FIGURE 12 and lift arm 158′ in FIGURE 6). Thus, the axis of roller 162 spacially follows along curve *f* when elevated and lowered. Now the radial movement, which is imparted by cam 156 to roller 162 and was measured as described above at 4°5.8′ intervals, can be laid off on curve *f* and the increasing increments 0–9 and the decreasing increments 9–18 serve to illustrate the smooth acceleration-deceleration vertical motion generated by cam 156. Note that there is very little deviation of curve *f* from the symmetry line *g* (discussed generally earlier) so that cam wheel 156 and cam bars 170, for all practical purposes, can be symmetrical.

Having measured the motion imparted by cam wheel 156 to roller 162, I next calculate the corresponding incremental vertical motion of support roller 166 (which equals the vertical motion of the transfer member 104 and therefore of the cam plate 174). This calculation involves deriving the multiplier effect of lift arm 158. By making the simplifying assumption that the arc generated by roller 166 in moving to position 166′ is equivalent to the chord therebetween and that this chord is parallel to the line of symmetry (see line *g* in FIGURE 12), then one finds that the Multiplier $= K \cos(\phi/2 + \theta)$; where K is my proportion factor (equal to 2 in the improved preferred embodiment, since the distance between pivot 160 and roller 166 is twice the distance between pivot 160 and roller 162) and where $\cos(\phi/2 + \theta)$ is my vertical-component-cosine factor. Thus, by multiplying the Multiplier times the total distance that cam 156 has moved roller 162 outward along curve *f* for the various increments 1 to 18, I derive the resultant vertical motion of the transfer frame 104 and of all the appurtenances thereof, e.g. cam bars 170, for each 4°5.8′ increment of rotation.

Curves and points *a* through *g* were drawn in a side elevation similar to that in FIGURE 10 where the cam wheel 156 rotation is counterclockwise using the second "elevation" segment of the cam wheel 156 to explain the vertical motion. In order to keep FIGURE 12 compact so a larger scale can be used, the remaining curves and points are drawn in a side elevation opposite from that in FIGURE 10 and similar to that in FIGURES 6, 9, and 11, where the crank arm roller 176 rotation is clockwise. Consequently, these latter curves and points explain the deviation of the shape of the "lowering" cam bar. The use of the second "elevation" segment of the cam wheel 156 to derive the shape of the "lowering" cam bar 170 is possible because of the symmetry of the cam wheel 156. Of course, the cam wheel 156 and the crank arm 172 always rotate in the same direction. They only appear not to in FIGURE 12 because I have two different superimposed geometric plots in the same figure.

The circular outline *h* traced by the axis of cam follower roller 176 is plotted using point *o* as the center of rotation. Since the vertical lowering motion starts when the crank arm 172, carrying roller 176, is at 36°52.2′, I continue by marking this point *i* on curve *h* as "*o*" and then marking off angularly equispaced intervals of 4°5.8′ along curve *h* in the direction of rotation. The resultant vertical motion previously derived above for each given increment is plotted vertically above these points, thus giving a set of 18 new points which define the central portion *i* to *j* of curve *k*. The new curve *k* is the locus of the axis of roller 176 relative to the moving cam plate 174. Using curve *k* the inner cam bar surface *m* is generated on cam plate 174 by the outer envelope to roller 176 as it passes along curve *k*. Curve *m*, in other words, is generated as roller 176 moves along curve *k* by the locus of the point of intersection between the diameter of roller 176 that is perpendicular to curve *i* and the outer tangent to that diameter.

The central portion of curve *m*, point *i'* to point *j'*, defines the dwell period of the horizontal motion during the complete 73°44.4′ vertical lowering. At these two points the roller 176 has a definite horizontal velocity while the transfer frame 104 has none; therefore, from point *i'* to point *p'* and from point *j'* to point *q'* the transfer frame 104 has to be decelerated and accelerated, respectively, from and to the simple harmonic velocity of the roller 176. Advantageously these latter arcuate portions are circular, each terminating in a vertical line which defines the remainder of curve *m*. The radius of these circular arcs is just long enough to accelerate the articles 102 on the transfer frame 104 without injurious jerking but not so long as to unduly enlarge the cam bar size. The exact radius depends upon the shape of the transfer cycle, the fragility of the articles, the effectiveness of the article holding means, and many similar factors.

The external cam bar surface *n* is similarly derived by plotting the locus *r* of the outer cam roller 178 relative to the moving cam plate 174, and then deriving this curve *n* by tracing the inner envelope that is generated on cam plate 174 by roller 178 as it passes along curve *r*. This curve *r* is derived by selecting a series of points on curve *h*, such as intervals 1–18, determining the radial slope from point *o* at each of these points, and then by laying off a radial extension equal to the distance between the axis of roller 176 and of roller 178 at these slopes from the corresponding (vertically or horizontally, relatively displaced) points on curve *k*. Joining these radial extension points in a smooth curve gives the desired curve *r*.

While the specifications for the shape of the cam bars 170 are a non-obvious novel conception in the art of article transfer, however with the aid of the above disclosure divulging these critical specifications, the illustrated configuration of the cam bars 170 and other modifications thereof to give different resultant transfer paths could be worked out by a competent draftsman by well-known empirical geometric methods.

FIGURE 11 shows another embodiment of the present invention similar to the one illustrated in the FIGURES 6–10 except that in the second cam-and-follower system, which generates the horizontal component of the transfer motion, the outer cam follower roller 178 and external cam bar surfaces are replaced by a flipping dog 275 and a flipping dog biasing means 277. Cam plates 270 are identical to cam bars 170 except for the absence of the external cam surfaces. The purpose of the flipping dog 275 is to guide the cam follower roller 276 alternately along the inner cam surfaces in a positive manner by providing a path just wide enough for roller 276 to pass along. In other words, as crank arm 272 continues to rotate clockwise, roller 276 moves down into the lower slot position free of flipping dog 275 which latter, urged by weight 277, switches counterclockwise about its central pivot point back to its rest position ready to guide roller 276 up along the left-hand inner cam surface. As roller 276 rises along the left-hand cam surface in passing the central pivot point, it switches the flipping dog 276 clockwise until it rises into the upper slot position again free of the flipping dog 276 which latter again is switched back to the rest position by weight 277 ready to guide roller 276 down along the right-hand cam surface.

The horizontal component of the transfer motion is initially established by the crank arm 172 and the amplitude is limited by its length. This length may not provide enough travel without exceeding the limits of space available for its swing. Therefore, a motion-multiplier such as illustrated in the first preferred embodiment may be required to amplify the horizontal motion. When this is the case, it is within the scope of this invention to adapt the mounting of cam bars 170 to use with such a multiplier.

The transfer frame, or member, generally indicated at 104 in FIGURES 6 and 7 comprises a base beam 140, carried on support beams 142, on which latter are mounted support roller guides 144, which base beam 140 in turn carries article-holding-means rails 146 and 148. The article holding means 105 and 106, which are grouped at uniform intervals along transfer frame 104, are all the same except for the first at the receiving position which has only one V-shaped article holder 106a mounted on the left rail 146 as viewed in FIGURE 7. The other three holding means 105 and 106 are replaced at this end by article-positioning arm 107. Similarly, the article holding stations #1 to #N (where N is an integer to the total number of stations) comprise cradling means 108 which are grouped at uniform intervals along the machine frame 104 and are all identical except for the receiving station #1. Article holding station #1 comprises two pairs of tandem support rollers 108a (shown only at the left in FIGURE 7 for purposes of illustration but actually occurring at the right in the figure where 108 is indicated), which pairs rotatably engage the main bearing surfaces of the crankshaft 102. The different construction of station #1 is to enable a crankshaft carelessly placed in station #1 to be accurately positioned by article-positioning arm 107 and to be delivered in an accurate attitude to the successive article holding stations. The article holding stations are mounted on the machine frame 112 by cross members 180 which carry cradling means rails 182 and 184, notched support rails 186, and guard rails 188.

In order to stop the transfer apparatus between each completed cycle for a timed interval or to await a new initiating signal, a limit switch may be fitted to the machine to be tripped by a limit switch cam (as illustrated in FIGURE 3 on the first preferred embodiment) after each complete revolution, the latter being mounted for example on the drive shaft.

The full sequence of operation of this improved preferred embodiment of my invention is generally similar to that of my first preferred embodiment described above, and can best be visualized by reference to FIGURES 6 and 7. As the illustrated improved preferred embodiment results in rectangular motion, we can concentrate on the four separate steps: pick-up, forward, set-down, and return. One complete rotation of drive shaft 114 results in a complete transfer cycle with the advancement of all the articles along the longitudinal path of the machine from their respective stations to the next succeeding ones. The machine is shown in FIGURE 6 about half-way through the return motion, which is in the middle of the lower vertical dwell period and at the maximum horizontal return velocity. As the drive shaft 114 continues to rotate clockwise always at a constant speed, crank arm 172 continues to return the transfer frame 104 to the pick-up position while decelerating by an approximate simple harmonic motion. Just before the pick-up position is reached, roller 176 leaves the lower vertical slot between cam bars 170 and continues up the left-hand inner surface of the bulge causing smoothly increasing deceleration such that all horizontal motion of the transfer frame 104 ceases just as cam follower roller 162 ceases rolling along the first segment of cam wheel 156 ready to initiate vertical motion in the transfer frame 104 by starting up along the increasing radial surface of the second segment. This point is reached, in the illustrated machine, after a simultaneous rotation of cam wheel 156 and crank arm 172 driven by drive shaft 114 through 53°7.8′ from the position illustrated in FIGURE 6 (i.e., half of the 106°15.6′ required for the complete return portion).

As the clockwise rotation continues, roller 162 rolling up along the second segment of cam wheel 156 transmits a smooth vertical acceleration-deceleration motion to transfer frame 104 until the raised position shown by lift arm 158′ in phantom outline in FIGURE 6 is reached. As lift arm 158 rises carrying one end of the transfer frame 104 vertically with it, tie bar 168, identically connected with at least one similar lift arm (not shown in this improved preferred embodiment), simultaneously raises these other lift arms to carry the other end of the transfer frame 104, thereby evenly raising it vertically in the pick-up motion. Meanwhile rollers 176 and 178 in following along the bulge portion of left-hand cam bar 170 (which as explained above is adjusted in its shape to compensate for the vertical motion of the cam bar itself relative to that of the crank arm) have insured that no horizontal motion is being transmitted from the crank arm 172 to the transfer frame 104 during this vertical pick-up motion. This pick-up motion is naturally very slow at the point of actual first contact between the articles 102 and the article holding means 105 and 106 on the transfer frame with the majority of the vertical acceleration occurring after the articles 102 are settled on the transfer frame 104.

After a rotation of 73°44.4′ the pick-up motion stops and the forward motion starts. The forward transfer motion is essentially the same as that of the return motion except that the vertical dwell period is in the raised position along the third segment of cam wheel 156 and that the horizontal motion is now to the right and generated by the roller 176 operating in the upper vertical slot between the cam bars 170. After a rotation of 106°15.6′ the forward motion ceases and the set-down motion starts. Similarly, the set-down motion, which is just like pick-up but only in reverse, ceases after the rotation continues through 73°44.4′ at which time the return motion is initiated thus completing the cycle. As discussed above, a limit switch (not shown in this embodiment) can be installed to break into the continuity of the cycle, preferably interrupting the cycle at either the beginning or end of the return motion (since all transfer motion momentarily ceases at these points).

It is to be understood that the foregoing description of the present invention is to be taken as examples of preferred embodiments and that various changes as to the size, shape, material, and arrangement of the various parts of their equivalents may be made without departing from the spirit of the invention or from the scope of the claims below.

I claim:

1. Article transfer apparatus adapted to engage at least one article by vertical motion at one station, to move the article substantially horizontally along a path to the next succeeding station and disengage the article by vertical motion at that succeeding station, which comprises a machine frame, a transfer member, first cam-and-follower means rotatably mounted on said machine frame both to support and to impart the vertical component of motion to said transfer member, a crank rotatably mounted on said machine frame having two rollers mounted on the free end being radially spaced one from the other, a second cam fixed to said transfer member and defining a vertical slot in which said inner crank roller rides as said crank rotates whereby only horizontal motion is transmitted from said crank to said transfer member, which vertical slot is broadened along its central portion to accommodate a predetermined portion of said horizontal motion such that said inner crank roller upon riding first up one side and subsequently down the other side of said broadened central portion imparts a modified horizontal component of motion from said crank to said transfer member which combined with the vertical components results in a predetermined transfer path, said second cam further defining an outer guide surface along which said outer crank roller rides such that said inner crank roller is positively held against alternative sides of said broadened portion, and a drive mechanism for rotatably driving said first cam means and said crank continuously throughout at least one transfer cycle.

2. An apparatus as defined in claim 1 wherein the vertical and horizontal components of motion imparted separately by said first and second cams, respectively, to said transfer member result in a predetermined substantially rectangular transfer path.

3. An apparatus as defined in claim 1 wherein said first cam-and-follower means comprises a first cam rotatably mounted on said machine frame, said cam comprising a first segment having a constant radius and subtending a given angle determining the lower vertical dwell period of the transfer cycle, a third segment having a constant radius greater than that of the first and subtending a given angle determining the upper vertical dwell period, a second and fourth segment having radii increasing and decreasing respectively to connect that of the first with that of the third, the rate of increase of which determines the vertical acceleration of the transfer cycle, and a first cam follower comprising a lever pivotally connected to said machine frame and coupled with said first cam and with said transfer member by respective anti-friction bearing devices.

4. Article transfer apparatus adapted to engage at least one article by vertical motion at one station, to move the article substantially horizontally along a path to the next succeeding station and disengage the article by vertical motion at that succeeding station, which comprises a machine frame, a transfer member, first cam-and-follower means rotatably mounted on said machine frame both to support and to impart vertical motion to said transfer member, crank-and-follower means rotatably mounted on said machine frame, anti-friction bearing means mounted on the free end of said crank, horizontal-motion-cam means fixed to said transfer member and engaged by said anti-friction bearing means for receiving the predominantly horizontal motion therefrom and for transmitting only a controlled horizontal component of the motion to said transfer member, said horizontal-motion-cam means defining a generally vertical guide slot freely to accommodate vertical motion while transmitting horizontal motion, and flared to accommodate a predetermined portion of the anti-friction bearing means' horizontal motion, coupling means for keeping said anti-friction bearing means in positive contact with alternate surfaces of the guide surface of said horizontal-motion cam means, and a drive mechanism for rotatably driving said first cam means and said crank means continuously throughout at least one transfer cycle.

5. An article transfer apparatus adapted to engage at least one article by vertical motion at one station, to move the article substantially horizontally along a path to the next succeeding station, which comprises a machine frame, a transfer member, first cam-and-follower means rotatably mounted on said machine frame both to support and to impart the vertical component of motion to said transfer member, a crank rotatably mounted on said machine frame having a roller mounted on the free end thereof, a second cam fixed to said transfer member and defining a vertical slot in which said crank roller rides as said crank rotates whereby only horizontal motion is transmitted from said crank to said transfer member, which vertical slot is broadened along its central portion to accommodate a predetermined portion of said horizontal motion such that said crank roller upon riding up first one side and subsequently down the other side of said broadened central portion imparts a modified horizontal component of motion from said crank to said transfer member which combined with the vertical component results in a predetermined transfer path, a guide switch means pivotally mounted on an axis perpendicularly through the center of said broadened central portion for keeping said crank roller in positive contact with alternate sides of the guide surface of said second cam, and a drive mechanism for rotatably driving said first cam and said crank continuously throughout at least one transfer cycle.

6. Article transfer apparatus for transferring a plurality of articles in succession from station to station along a path comprising an elongated machine frame having a plurality of article holding stations at uniformly spaced points along the path, an elongated transfer member having a plurality of article holding means uniformly spaced along its length corresponding with the spacing of said stations and extending beyond said machine frame on at least one end for transferring the article at said end of said machine frame, a drive shaft on the frame, a crank arm fixed to said shaft, a push-pull lever pivotally mounted on said frame for swinging on a predominantly horizontal arc, a first connecting rod extending between, and pivotally connecting, said crank arm and said push-pull lever, a first roller mounted on said lever at a substantial radius from the latter's pivot axis, horizontal-motion-cam means secured to said transfer member for receiving the predominantly horizontal motion of said first roller and transmitting only a controlled horizontal component of the motion to said transfer member, said horizontal-motion-cam means defining a generally vertical guide slot freely to accommodate vertical motion while transmitting horizontal motion, and flared to accommodate a predetermined portion of the first roller's horizontal motion, a cam wheel fixed to said drive shaft for imparting the vertical component of motion to said transfer member, at least a pair of lift levers pivotally connected to the frame at spaced points, at least one additional connecting rod extending between and pivotally connecting said lift levers at uniform radii for maintaining them in parallel relationship, support rollers mounted on said lift levers, said support rollers being in rolling engagement with said transfer member, a cam follower arm engaging said cam wheel and transmitting lift motion to said lift levers, limit switch means, whereby said apparatus is deactivated after one complete transfer cycle, and a rotational drive means connected to said shaft.

7. Article transfer apparatus for transferring a plurality of articles in succession from station to station along a path comprising a machine frame having a plurality of article holding stations at uniformly spaced points along the path, a transfer member, a crank arm rotatively mounted on said machine frame, cam bearing means operatively connected to the free end of said crank arm, horizontal-motion-cam means secured to said transfer member for receiving the predominantly horizontal motion of said cam bearing means and transmitting only a controlled horizontal component of the motion to said transfer member, said horizontal-motion-cam means defining a generally vertical slot adapted to accommodate the vertical component of the cam bearing means' motion, and flared to accommodate a predetermined portion of its horizontal motion, a cam wheel rotatively mounted on said machine frame, cam-follower means bearing on said cam wheel to transmit vertical motion imparted therefrom to said transfer member and including at least a pair of lift levers pivotally connected to the frame at spaced points along said transfer member, at least one connecting rod pivotally connecting said lift levers for maintaining them in parallel relationship, anti-friction bearing means on said lift levers, each at a substantial radius from the pivotal connection to the frame and in bearing engagement with said transfer member at longitudinally spaced points thereof, whereby to move said member only vertically when said lift levers are swung, and a drive means for rotating said crank arm and said cam wheel.

8. An apparatus as defined in claim 7 wherein said transfer member further includes a plurality of article holding means uniformly spaced along its length corresponding to the spacing of said stations and further wherein the generally vertical slot of said horizontal-motion-cam means is flared to a configuration that accommodates all motion of said cam bearing means during at least those portions of the transfer cycle where said transfer member, with its article holding means, vetrically engages and disengages said articles at said stations, whereby said articles are transferred vertically only, with accuracy and safety, during said transfer cycle portions.

9. Article transfer apparatus adapted to transfer at least one article from station to station along a path which comprises a transfer member, a single rotary drive, means connected to the rotary drive for converting said rotary motion of said rotary drive to a controlled vertical component of motion for said transfer member, a crank arm rotatively driven by said rotary drive, means connecting said crank arm and said transfer member and including vertical-lost-motion coupling means for imparting only horizontal motion to said transfer member and further including horizontal-motion-cam means defining a lost-motion device for controlling the horizontal component of the transfer member's motion by absorbing predetermined amounts of the horizontal motion generated by said crank arm, whereby said vertical and horizontal components of motion are respectively isolated, modified, and recombined into a predetermined transfer path for said transfer member.

References Cited by the Examiner

FOREIGN PATENTS 1,118,506  3/56  France.

SAMUEL F. COLEMAN, *Primary Examiner.*

ERNEST A. FALLER, JR., *Examiner.*